Patented Oct. 19, 1937

2,096,110

UNITED STATES PATENT OFFICE 2,096,110

ADHESIVE

Harvey G. Kittredge, Dayton, and Sylvester J. Broderick, Yellow Springs, Ohio, assignors to Foilfilm, Inc., Dayton, Ohio, a corporation of Ohio No Drawing. Application August 21, 1935, Serial No. 37,210

1 Claim. (Cl. 134—23.3)

It is the object of this invention to provide an adhesive compound which can be applied either hot or cold, and which, when applied, dries rapidly, providing an air-tight bond which is sufficiently resilient to permit of the expansion and contraction of materials to which it is attached, such as metal, paper and the like.

It is an object to provide an adhesive that is air-tight and gas-proof, that is not affected by moisture and which has a marked affinity for metal, so that it is particularly adaptable for sealing packages of metal foil.

This new article of manufacture consists of an adhesive comprising chlorinated diphenyls of varying viscosity and a syntheic resin, such as paracoumarone-indene resin. For instance, a mixture of a viscous chlorinated diphenyl, a solid chlorinated diphenyl and a paracoumarone-indene resin can be effected by heating to approximately 100° C. and stirring. The composition of the chlorinated diphenyls as to the amount of viscosity can be regulated by varying the amount of chlorination. The preferred percentage of the elements of the combination is 25% of viscous chlorinated diphenyl, 50% of solid chlorinated diphenyl, and 25% of paracoumarone-indene resin.

The proportion of the viscous chlorinated diphenyl can vary from 5% to 35%, the proportion of the solid chlorinated diphenyl can vary from 5% to 70% and the proportion of paracoumarone-indene resin can vary from 5% to 35%. The function of the viscous chlorinated diphenyl is to act as an adhesive agent, the function of the solid chlorinated diphenyl is to act both as an adhesive and as a strengthening agent, and the function of the paracoumarone-indene resin is to render both strength and tackiness, in order to facilitate the initial adhesion. The heating should take place until there is a mixture. The exact temperature of the heating will depend upon the percentages of the elements forming the compound.

It will be understood that we desire to comprehend within our invention such modifications as may be necessary to adapt it to varying conditions and uses.

Having thus fully described our invention, what we claim as new and desire to secure by Letters Patent, is:

In combination, in an adhesive, of approximately 25% of viscous chlorinated diphenyl, approximately 50% of solid chlorinated diphenyl and approximately 25% of paracoumarone-indene resin.

HARVEY G. KITTREDGE.
SYLVESTER J. BRODERICK.